(12) United States Patent
Roennow et al.

(10) Patent No.: US 10,990,704 B2
(45) Date of Patent: Apr. 27, 2021

(54) MANAGEMENT OF CRYPTOGRAPHIC TRANSACTIONS

(71) Applicant: Nokia Technologies Oy, Espoo (FI)

(72) Inventors: Troels Roennow, Cambridge (GB); Hongwei Li, Cambridge (GB); Enrique Martin Lopez, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 132 days.

(21) Appl. No.: 16/086,643

(22) PCT Filed: Mar. 23, 2016

(86) PCT No.: PCT/FI2016/050187
§ 371 (c)(1),
(2) Date: Sep. 20, 2018

(87) PCT Pub. No.: WO2017/162904
PCT Pub. Date: Sep. 28, 2017

(65) Prior Publication Data
US 2019/0108364 A1    Apr. 11, 2019

(51) Int. Cl.
*G06F 21/64* (2013.01)
*H04L 9/32* (2006.01)
(Continued)

(52) U.S. Cl.
CPC ......... *G06F 21/64* (2013.01); *G06Q 20/0658* (2013.01); *G06Q 20/389* (2013.01);
(Continued)

(58) Field of Classification Search
CPC ................ G06F 21/64; G06Q 20/4037; G06Q 20/0658; G06Q 20/38215; G06Q 20/3825;
(Continued)

(56) References Cited

U.S. PATENT DOCUMENTS 9,374,370 B1 *   6/2016  Bent, II ............... H04W 12/068
10,475,030 B2 * 11/2019  Castinado ............ G06Q 20/401
(Continued)

FOREIGN PATENT DOCUMENTS

CN   103927656 A   7/2014
CN   103927659 A   7/2014
(Continued)

OTHER PUBLICATIONS

"The Fintech 2.0 Paper: Rebooting Financial Services", Santander InnoVentures, Retrieved on Sep. 25, 2018, Webpage available at : http://santanderinnoventures.com/fintech2/.
(Continued)

*Primary Examiner* — Badrinarayanan
(74) *Attorney, Agent, or Firm* — Laine IP Oy

(57) ABSTRACT

According to an example aspect of the present invention, there is provided an apparatus comprising at least one processing core, at least one memory including computer program code, the at least one memory and the computer program code being configured to, with the at least one processing core, cause the apparatus at least to compile a set of transactions in a block chain based resource management system that have taken place after the most recent block was established, establish a new block in the block chain, and in establishing the new block, for transactions associated with verification accept messages and lacking sufficient resources, cause transferring of the lacking resources from verification nodes having sent the verification accept messages.

17 Claims, 7 Drawing Sheets

(51) Int. Cl.
*G06Q 20/40* (2012.01)
*G06Q 20/06* (2012.01)
*G06Q 20/38* (2012.01)

(52) U.S. Cl.
CPC ... *G06Q 20/3825* (2013.01); *G06Q 20/38215* (2013.01); *G06Q 20/4037* (2013.01); *H04L 9/3239* (2013.01); *G06Q 2220/00* (2013.01); *H04L 2209/38* (2013.01); *H04L 2209/56* (2013.01)

(58) Field of Classification Search
CPC .............. G06Q 20/389; G06Q 2220/00; H04L 9/3239; H04L 2209/38; H04L 2209/56
USPC .......................................................... 713/168
See application file for complete search history.

(56) References Cited

U.S. PATENT DOCUMENTS

| | | | | |
|---|---|---|---|---|
| 2002/0022966 | A1* | 2/2002 | Horgan | G06Q 20/342 705/35 |
| 2002/0038270 | A1* | 3/2002 | Shin | G06Q 40/06 705/36 R |
| 2014/0181506 | A1* | 6/2014 | Resch | H04L 63/0823 713/156 |
| 2014/0279544 | A1* | 9/2014 | Baird | G06Q 20/322 705/44 |
| 2015/0046337 | A1* | 2/2015 | Hu | G06Q 20/0658 705/65 |
| 2015/0170112 | A1* | 6/2015 | DeCastro | G06Q 20/381 705/39 |
| 2015/0227890 | A1* | 8/2015 | Bednarek | G06Q 30/0635 705/26.81 |
| 2015/0227897 | A1* | 8/2015 | Loera | G06Q 20/0855 347/5 |
| 2015/0294308 | A1* | 10/2015 | Pauker | G06Q 20/02 705/67 |
| 2015/0310424 | A1* | 10/2015 | Myers | G06Q 20/3678 705/69 |
| 2015/0348008 | A1* | 12/2015 | Khan | G06Q 20/382 705/44 |
| 2015/0363778 | A1* | 12/2015 | Ronca | H04L 9/3236 705/71 |
| 2015/0363782 | A1* | 12/2015 | Ronca | G06Q 20/4016 705/75 |
| 2015/0371224 | A1* | 12/2015 | Lingappa | G06Q 20/3829 705/71 |
| 2015/0379510 | A1* | 12/2015 | Smith | G06Q 20/3829 705/71 |
| 2016/0284033 | A1* | 9/2016 | Winand | G06Q 10/06315 |
| 2016/0292672 | A1* | 10/2016 | Fay | G06Q 20/3829 |
| 2016/0342978 | A1* | 11/2016 | Davis | G06Q 20/40 |
| 2016/0342989 | A1* | 11/2016 | Davis | G06Q 20/3674 |
| 2017/0092062 | A1* | 3/2017 | Tsutsui | G06Q 30/0241 |
| 2017/0177437 | A1* | 6/2017 | Moertl | G06F 3/0619 |
| 2017/0180469 | A1* | 6/2017 | Ford | H04L 67/1008 |
| 2017/0228731 | A1* | 8/2017 | Sheng | G06Q 20/401 |
| 2017/0243213 | A1* | 8/2017 | Castinado | G06Q 20/352 |
| 2017/0243214 | A1* | 8/2017 | Johnsrud | G06Q 20/3823 |
| 2017/0243287 | A1* | 8/2017 | Johnsrud | G06Q 20/02 |

FOREIGN PATENT DOCUMENTS

| | | |
|---|---|---|
| WO | 2010/149333 A1 | 12/2010 |
| WO | 2015/135018 A1 | 9/2015 |
| WO | 2016015041 | 1/2016 |
| WO | 2016029119 | 2/2016 |

OTHER PUBLICATIONS

"Device Democracy—Saving the Future of the Internet of Things", IBM, Retrieved on Sep. 27, 2018, Webpage available at : https://www-01.ibm.com/common/ssi/cgi-bin/ssialias?infotype=PM&subtype=XB&htmlfid=GBE03620USEN.

"Bitcoin is an Innovative Payment Network and a New Kind of Money", Bitcoin, Retrieved on Sep. 25, 2018, Webpage available at :https://bitcoin.org/en/.

"Join RippleNet", Ripple, Retrieved on Sep. 25, 2018, Webpage available at :https://ripple.com/.

"Build Unstoppable Applications", Ethereum, Retrieved on Sep. 25, 2018, Webpage available at :https://ethereum.org/.

"Proof-of-Work System", Wikipedia, Retrieved on Sep. 25, 2018, Webpage available at :https://en.wikipedia.org/wiki/Proof-of-work_system.

"Hash Function", Wikipedia, Retrieved on Sep. 25, 2018, Webpage available at :https://en.wikipedia.org/wiki/Hash_function.

Bogliolo et al., "Virtual Currency and Reputation-based Cooperation Incentives in User-centric Networks", 8th International Wireless Communications and Mobile Computing Conference (IWCMC), Aug. 27-31, 2012, 6 pages.

"Investment Using Virtual Currency or Distributed Ledger Technology", European Securities and Markets Authority (ESMA), Retrieved on Sep. 25, 2018, Webpage available at :https://www.esma.europa.eu/file/12953/download?token=3HP7J2RY.

International Search Report and Written Opinion received for corresponding Patent Cooperation Treaty Application No. PCT/FI2016/050187 , dated Jun. 30, 2016, 15 pages.

Barner, S et al. Bitter to Better—How to Make Bitcoin a Better Currency [online]. vol. 7397 of the series Lecture Notes in Computer Science. Springer Berlin Heidelberg, Feb. 27-Mar. 2, 2012 [retrieved on Jun. 23, 20063]. Retrieved from the Internet: <URL: http://link.springer.com/chapter/10.1007%2F978-3-642-32946-3_29> Chapter: Financial Cryptography and Data Security, pp. 399-414, Online ISBN:978-3-642-32946-3.

King, S and Nadal S. PPCoin: Peer-to-Peer Crypto-Currency with Proof-of-Stake. Internet Archive, Community Texts [online database], Aug. 2012 [retrieved on Jun. 23, 2016}. Retrieved from the Internet: <URL: https://ia601705.us.archive.org/33/items/PPCoinPaper/ppcoin-paper.pdf>.

Everaere, P et al. Double Spending Protection for E-Cash Based on Risk Management. ResearchGate [online Database], Oct. 2010 [retrieved on Jun. 27, 2016]. Retrieved from the Internet: <URL: https://www.researchgate.net/publication/220905312>.

Extended European Search Report received for corresponding European Patent Application No. 16895297.6, dated Sep. 16, 2019, 8 pages.

* cited by examiner

MANAGEMENT OF CRYPTOGRAPHIC TRANSACTIONS

RELATED APPLICATION

This application was originally filed as PCT Application No. PCT/FI2016/050187 filed Mar. 23, 2016.

FIELD

The present application relates to the field of managing cryptographic transactions.

BACKGROUND

Transactions in digital systems may take several different forms. For example, credit card transactions may be verified by querying, from an issuer of the card, whether a credit account associated with the credit card has sufficient remaining credit to cover the transaction. Additionally, a client identity may be verified, which may take place by requesting the client to enter a pin code or to provide a signature. In some cases, the client may be requested to present a proof-of-identity document, such as a passport. Yet further, a bank issuing the credit card may call the client's mobile phone before approving the transaction, in case the transaction meets certain criteria.

Where the digital system is not centrally managed, verifying a transaction may take place by requiring a proof-of-work from the client before agreeing to the verification. For example, before accepting a transaction, a computer system may issue a challenge to the client. The challenge may comprise a mathematical challenge, such as a partial hash function reversal, which the client can perform and the performance of which requires a moderate investment in processor cycles, for example. For example, the challenge may be computationally simple for the verifier to generate and to verify an answer the client provides is correct, but computationally more challenging for the client to perform to obtain the answer.

A further verification method is a block chain, wherein a resource is recorded in a ledger, which may be public. Changes in resource ownership take the form of transactions, wherein a transaction may comprise an identifier of a new owner, that is the recipient, of the resource, together with a cryptographic signature of the previous owner, that is the sender, such that malicious attackers cannot re-assign resources they do not own. A cryptographic signature may be generated using a private key of a private key-public key pair. Validity of the cryptographic signature may be verified using the public key, while the signature can only be generated using the private key. While the public key may be freely shared with no reduction in security, the private key is closely kept by the owner.

In a block chain, transactions are recorded in blocks comprised in the chain, wherein the chain may comprise a distributed database. In principle, a chain of previous owners, or at least their identifiers, of each resource can be assessed based on the block chain.

SUMMARY OF THE INVENTION

The invention is defined by the features of the independent claims. Some specific embodiments are defined in the dependent claims.

According to a first aspect of the present invention, there is provided an apparatus comprising memory configured to store a block chain segment of a block chain based resource management system, and at least one processing core configured to process, based at least partly on the block chain segment, a verification request concerning a transaction, and to cause transmission of a verification accept message in response to the processing indicating the transaction is acceptable, before a new block is established in the block chain.

Various embodiments of the first aspect may comprise at least one feature from the following bulleted list:

- at least one processing core is configured to process the verification request at least partly by determining, whether a cryptographic signature comprised in the verification request is associated with sufficient resources to perform the transaction
- the at least one processing core is configured to process the verification request at least partly by determining, whether resources of a verification node would be transferred in the transaction
- the apparatus comprises a verification node, and the at least one processing core is configured to process the verification request at least partly in collaboration with other verification nodes
- the collaboration comprises transmitting the verification request to the other verification nodes
- the collaboration comprises requesting further block chain segments from the other verification nodes
- the verification accept message comprises a cryptographic signature of the apparatus
- the apparatus is configured to transmit the verification accept message to the node that sent the verification request message to the apparatus
- the apparatus is configured to transmit the verification accept message to at least one further verification node.

According to a second aspect of the present invention, there is provided an apparatus comprising at least one processing core, at least one memory including computer program code, the at least one memory and the computer program code being configured to, with the at least one processing core, cause the apparatus at least to: receive a new transaction in a block chain based resource management system cause transmission, to a verification node, of a verification request concerning the transaction, and transmit the transaction to a network responsive to a verification accept message from the verification node, before a new block is established in the block chain.

According to a third aspect of the present invention, there is provided an apparatus comprising at least one processing core, at least one memory including computer program code, the at least one memory and the computer program code being configured to, with the at least one processing core, cause the apparatus at least to compile a set of transactions in a block chain based resource management system that have taken place after the most recent block was established, establish a new block in the block chain, and in establishing the new block, for transactions associated with verification accept messages and lacking sufficient resources, cause transferring of the lacking resources from verification nodes having sent the verification accept messages.

Various embodiments of the third aspect may comprise the feature wherein the at least one memory and the computer program code are configured to, with the at least one processing core, cause the transferring of the lacking resources by including, for each transaction associated with a verification accept message and lacking sufficient resources, in the new block, a transaction that transfers resources from the verification node that sent the associated verification message to a recipient of the transaction lacking sufficient resources.

According to a fourth aspect of the present invention, there is provided a method comprising storing, in an apparatus, a block chain segment of a block chain based resource management system, processing, based at least partly on the block chain segment, a verification request concerning a transaction, and causing transmission of a verification accept message in response to the processing indicating the transaction is acceptable, before a new block is established in the block chain.

Various embodiments of the fourth aspect may comprise at least one feature corresponding to a feature on the preceding bulleted list laid out in connection with the first aspect.

According to a fifth aspect of the present invention, there is provided a method, comprising receiving a new transaction in a block chain based resource management system, causing transmission, to a verification node, of a verification request concerning the transaction, and transmitting the transaction to a network responsive to a verification accept message from the verification node, before a new block is established in the block chain.

According to a sixth aspect of the present invention, there is provided a method, comprising: compiling a set of transactions in a block chain based resource management system that have taken place after the most recent block was established, establishing a new block in the block chain, and in establishing the new block, for transactions associated with verification accept messages and lacking sufficient resources, causing transferring of the lacking resources from verification nodes having sent the verification accept messages.

Various embodiments of the sixth aspect may comprise the feature wherein causing the transferring of the lacking resources comprises including, for each transaction associated with a verification accept message and lacking sufficient resources, in the new block, a transaction that transfers resources from the verification node that sent the associated verification message to a recipient of the transaction lacking sufficient resources.

According to a seventh aspect of the present invention, there is provided an apparatus comprising means for storing a block chain segment of a block chain based resource management system, means for processing, based at least partly on the block chain segment, a verification request concerning a transaction, and means for causing transmission of a verification accept message in response to the processing indicating the transaction is acceptable, before a new block is established in the block chain.

According to an eighth aspect of the present invention, there is provided an apparatus comprising means for receiving a new transaction in a block chain based resource management system, means for causing transmission, to a verification node, of a verification request concerning the transaction, and means for transmitting the transaction to a network responsive to a verification accept message from the verification node, before a new block is established in the block chain.

According to a ninth aspect of the present invention, there is provided an apparatus comprising means for compiling a set of transactions in a block chain based resource management system that have taken place after the most recent block was established, means for establishing a new block in the block chain, and wherein in establishing the new block, for transactions associated with verification accept messages and lacking sufficient resources, the means for establishing are configured to cause transferring of the lacking resources from verification nodes having sent the verification accept messages.

According to a tenth aspect of the present invention, there is provided a non-transitory computer readable medium having stored thereon a set of computer readable instructions that, when executed by at least one processor, cause an apparatus to at least store a block chain segment of a block chain based resource management system, process, based at least partly on the block chain segment, a verification request concerning a transaction, and cause transmission of a verification accept message in response to the processing indicating the transaction is acceptable, before a new block is established in the block chain.

According to an eleventh aspect of the present invention, there is provided a non-transitory computer readable medium having stored thereon a set of computer readable instructions that, when executed by at least one processor, cause an apparatus to at least receive a new transaction in a block chain based resource management system, cause transmission, to a verification node, of a verification request concerning the transaction, and transmit the transaction to a network responsive to a verification accept message from the verification node, before a new block is established in the block chain.

According to a twelfth aspect of the present invention, there is provided a non-transitory computer readable medium having stored thereon a set of computer readable instructions that, when executed by at least one processor, cause an apparatus to at least compile a set of transactions in a block chain based resource management system that have taken place after the most recent block was established, establish a new block in the block chain, and wherein in establishing the new block, for transactions associated with verification accept messages and lacking sufficient resources, cause transferring of the lacking resources from verification nodes having sent the verification accept messages.

According to a thirteenth aspect of the present invention, there is provided a computer program configured to cause a method in accordance with at least one of the fourth, fifth or sixth aspects to be performed.

EMBODIMENTS

In a block chain based resource management system, transaction delay may be reduced, and/or the resource double spending problem be alleviated, by verifying a transaction before a new block is established in the resource management system. The verifying may take place in a verification node comprised in the resource management system. The verification node may assume some risk from the verification procedure in case it chooses to verify a specific transaction. Block chain based resource management systems compatible with the present invention may manage various kinds resources, including, for example, file storage capacity, real-time ridesharing, smart contracts and digital cryptocurrency.

Figure 1:
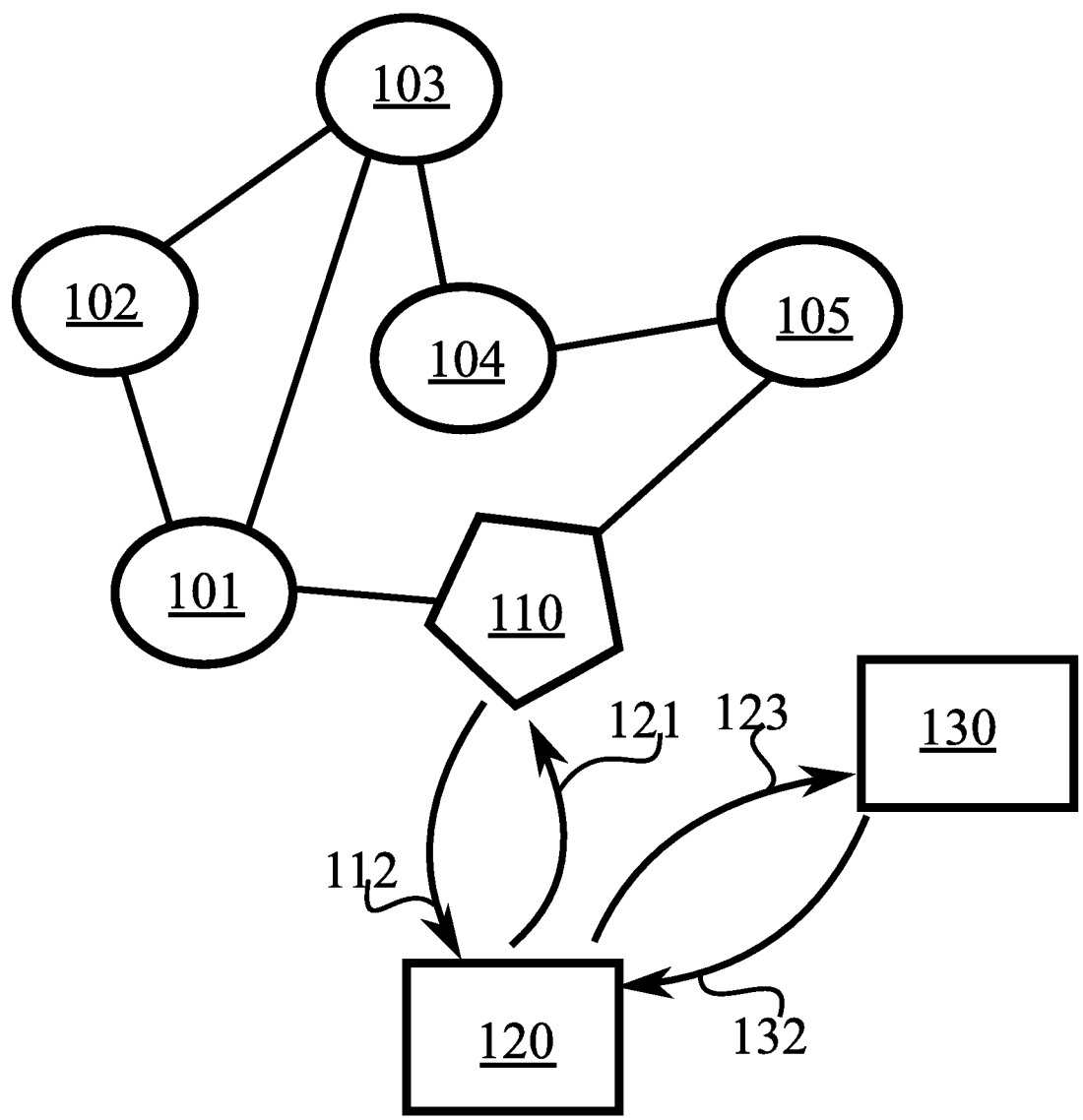
FIG. 1 illustrates an example system in accordance with at least some embodiments of the present invention.

FIG. 1 illustrates an example system in accordance with at least some embodiments of the present invention. A block chain based resource management system, referred to herein for the sake of brevity as "the system", is represented by nodes 101, 102, 103, 104, 105 and 110. These nodes are mutually addressable in a suitable way, for example, they may be connected to an internet protocol, IP, network. Messages released into the IP network with a recipient address are routed by the network to the recipient node identified by the recipient address. IP is not the only suitable networking technology used, for example, other peer-to-peer networking models are also suitable.

Nodes 101, 102, 103, 104, 105 and/or 110 maintain the block chain. This means that each node stores a segment of the block chain, wherein the segment may comprise the entire block chain or a part of the block chain. The segments in various nodes need not be of the same length. The block chain is an ordered sequence of blocks. When a new block is established, it is added to the block chain as a most recent established block. The block chain may be a replicated, distributed database of transactions concerning the resources that are managed by the system. A block comprises a time-stamped batch of transactions. A block may further comprise a hash of a prior block, which immediately precedes the block in the block chain, linking thus the blocks together. A block may further comprise a proof-of-work, which will be described in more detail hereinbelow.

When the system is used, transactions are performed involving the resources that are managed by the system. Transactions performed since establishment of the most recent established block are included in the next block, that is, the next block in the sequence of blocks.

A transaction may comprise a transfer of resources to a recipient account. A transaction may comprise a data structure or message, which comprises an identifier and/or quantity of the resource to be transferred, an identifier of a recipient account and a cryptographic signature of the sender of the resource. Depending on the system, a sender account may also be identified in the transaction. Thus, the cryptographic signature, which is created using the private key of the sender, guards against theft of the resource, since only the sender is in possession of the private key.

To establish the next block, the transactions are broadcast into the network. Broadcasting here refers to a dissemination method suitable for the context, which will cause the transactions to be communicated to the nodes of the system in general. Reaching each and every node with each and every transaction is not strictly necessary. In case a transaction is verified, it may be broadcast into the network with verification information. Verification information may comprise an identity of a verification node that verified the transaction. A node establishing the next block may be known as a miner node. A miner node may compile a set of transactions, which it receives from the broadcasts, for the next block, and search for a proof-of-work code that covers all the transactions in the set of transactions for the next block. For example, the proof-of-work code may be a numerical value, with which the contents of the next block, that is, the set of transactions, hashes to a value that is less than a threshold. More generally, there may be a target area of an output space of a hash function, wherein the target space need not be in the low end of the target space. The smaller the target area is, the more difficult it is to discover the proof-of-work.

Once a miner discovers the proof-of-work, it can publish the block, which other nodes of the system will then add to the block chain as the new most recent established block.

In case the miner node discovers a proof-or-work based on an incomplete set of transactions, for example if some transactions didn't reach the miner node, other nodes in the network will not accept the block into the block chain, and it will be excluded from a consensus version of the block chain in the system.

Since an output of a hash function is a pseudorandom function of the input, the set of transactions, hashed by itself, produces a hash value that is essentially randomly placed in the output space of the hash function. Note, that the set of transactions may be completely or representatively present as input to the hash function. Modifying the input with a candidate proof-of-work code, which may be known as a nonce, will produce a new hash value, which again is essentially randomly placed in the output space of the hash function. The modification may be as slight as a single bit. Therefore, searching for the correct proof-of-work code, which satisfies a pre-agreed criterion concerning its location in the output space of the hash function, requires repeatedly deriving a hash value with a different candidate proof-of-work code modifying the input to the hash function. Once a proof-of-work code that, with the transactions, produces a hash value in the target area of the output space of the hash function is found, the block is ready. A ready block may be distributed to the system to establish it therein in the block chain.

Once a new block is established, the block chain becomes longer. A transaction is considered the more reliable, the larger the number of blocks established since the block where the transaction is comprised. This is so, since a transactions are hashed into the chain of blocks, and discrepancies in the block chain are resolved as the block chain gets longer. In detail, maliciously modifying a transaction in a block far down the chain would involve re-doing the work of finding proofs-of-work for all subsequent blocks, since the input to the hash function for the block comprising the transaction would be changed, causing the resulting hash value, with the proof-of-work in that block, to no longer be disposed in the desired area in the output space of the hash function.

Where the time between block establishments is long, say, 10 or 15 minutes, an uncertainty as to a validity of a transaction may arise until the next block is established. In principle, an owner might send the same resource to two recipients in two transactions. This would be discovered in connection with establishing the next block, since there would be two competing owners of the resource, but this would not necessarily be immediately recognized.

A verification node, comprised in the system, may overcome problems related to the delay between consecutive block establishments. In terms of FIG. 1, considering for the sake of illustration a cryptocurrency system, a merchant 120 may sell an item to customer 130. In connection with releasing the item to customer 130, merchant 120 may request payment in the cryptocurrency. This request is illustrated as message 123 in FIG. 1. Responsively, customer 130 compiles a transaction and provides it to merchant 120. This is illustrated as message 132 in FIG. 1.

To verify the transaction, merchant 120 may provide the transaction to verification node 110, in message 121. Verification node 110, responsive to verifying the transaction, may provide a verification acceptance message 112 to merchant 120 as a response to message 121. Message 121 may be seen as a verification request of the transaction. A verification request may comprise the transaction, or a link to the transaction. Responsive to verification acceptance message 112, merchant 120 may release the item to customer 130. Verification acceptance message 112 may comprise a cryptographic signature of verification node 110. An advantage is therefore gained, for example, where customer 130 seeks to buy access rights to digital content, since the sale may be reliably completed without waiting for the next block to be established. Verification acceptance message 112 may be transmitted to the node that sent the verification request message 121, in this case merchant 120. Verification acceptance message 112 may be transmitted also to at least one further verification node.

Verification node 110 may store a segment of the block chain, like other nodes in the system. Processing verification request 121 may comprise checking, based on the block chain segment, that customer 130 is the present owner of the resources the transaction involves, that is, customer 130 is seeking to use his own resources. In case customer 130 is not the current owner of the resources, verification node 110 may decide to either simply not send the verification accept message 112, or to send instead a verification refused message. In case the verification based on the block chain segment fails, it may be beneficial to wait for establishment of the next block in the block chain, to resolve the conflict. In this sense, transmitting a verification refuse message may be unnecessary.

Processing the verification request may comprise checking the cryptographic signature in the transaction has been produced with the correct private key. Where the cryptographic signature fails verification, it may be unnecessary to even check if customer 130 overall has sufficient resources for the transaction.

Processing may comprise checking that verification node 110 is not aware of any previous transaction, by the owner of the resource, concerning the resource, after establishment of the most recent block. This mitigates the double spending problem.

Processing the verification request may comprise checking, whether resources owned by a verification node would, in the transaction, be transferred to another owner. Verification node 110 may be configured to reject, or not verify, such transactions. Likewise, processing the verification request may comprise checking whether verification node 110 has a quantity of resources sufficient to cover the transaction, in case it turns out to lack resources in connection with establishing the next block. Verification node 110 may be configured to not verify transactions that involve transferring mode resources than verification node has at its disposal.

Processing the verification request may comprise collaborating with other verification nodes. For example, where verification node 110 determines a block in the block chain that verification node 110 doesn't have would be needed, verification node 110 may request older blocks from other verification nodes. Alternatively, collaborating may comprise verification node 110 transmitting the verification request to at least one further verification node. In some embodiments, verification node 110 distributes the verification request to a set of verification nodes, and receives responses from the set of verification nodes. Verification node 110 may then transmit the verification accept message merchant 120 if, and only if, none of the responses from the set of verification nodes is a rejection of the transaction. Using a set of verification nodes may be useful in guarding against the double spending problem, since other verification nodes may know of a prior transaction involving the same resource as the transaction, which the resource owner has made in another part of the system, after the most recent block establishment.

When the time comes to establish the next block in the block chain, a node establishing the block may compile, as described above, a set of transactions that have taken place since the most recent established block. The next block will comprise this set of transactions. In connection with establishing the next block, the node may identify which transactions lack resources, that is, which transactions involve resources that the resource sender does not control. This may be the case, for example, in case the sender has compiled a fraudulent transaction involving transferring resources the sender doesn't own to a recipient. From among the transactions lacking resources, the node may identify those that have been verified by a verification node, that is, those transactions concerning which a verification node has transmitted a verification acceptance message. Transactions lacking resources that have not been verified may be discarded when compiling the set of transactions for the next block, for example.

For each verified transaction lacking resources, the node may cause transferring of resources owned by the verification node that verified the transaction, to make up for the missing resources. In other words, the verification node may be made to make up for a loss that a merchant would otherwise have incurred from the transaction. The node may cause the transferring, for example, by compiling a new transaction that transfers resources of the verification node to the recipient of the original verified transaction that lacks resources. The new transaction may be included in the block being prepared for establishment, as other nodes in the system are also enabled to generate the new transaction, wherefore the new transaction, in some embodiments, doesn't need to be propagated in the system. This reduces the delay in handling transactions lacking resources.

Verification nodes may be configured to charge merchants a fee, in terms of resources, for verifying transactions, to thereby obtain resources for making up for erroneously verified transactions that lack resources. The fee may be 0.1%, 1% or 2% of the amount of resources involved in the transaction to be verified, for example. In this sense, the verification function may be seen as a form of insurance in addition to speeding-up of the transaction clearing.

In some embodiments, the system maintains a list of nodes authorized to issue verification accept messages, and thereby verify transactions. Further, in some embodiments, verification nodes maintain a block chain distinct from the one maintained in the system nodes. The block chain in verification nodes may then be based, instead of a proof-of-work principle, on a proof-of-stake principle. In a proof-of-stake block chain, rather than demonstrating that computational work has been done, a node needs to demonstrate ownership of a certain amount of resources. This could raise an entry barrier to commit fraud, since an imposter would need to control at least one verification node, 51% of computational power in the proof-of-work nodes and a 51% stake of resources in the system. In a proof-of-stake system, a block chain maintained by verification nodes may be a separate, secondary chain based on proof-of-stake. To compromise the overall system, an attacker would need to compromise both the main block chain based on proof-of-work and the secondary block chain based on proof-of-stake, since the same transactions would be recorded in both block chains. In practice, a proof-of-stake block chain may provide an advantage in that less energy is spent than in a proof-of-work block chain, since the proof-of-work method may require a large input of numerical computer calculation resources, which consume energy.

Figure 2:
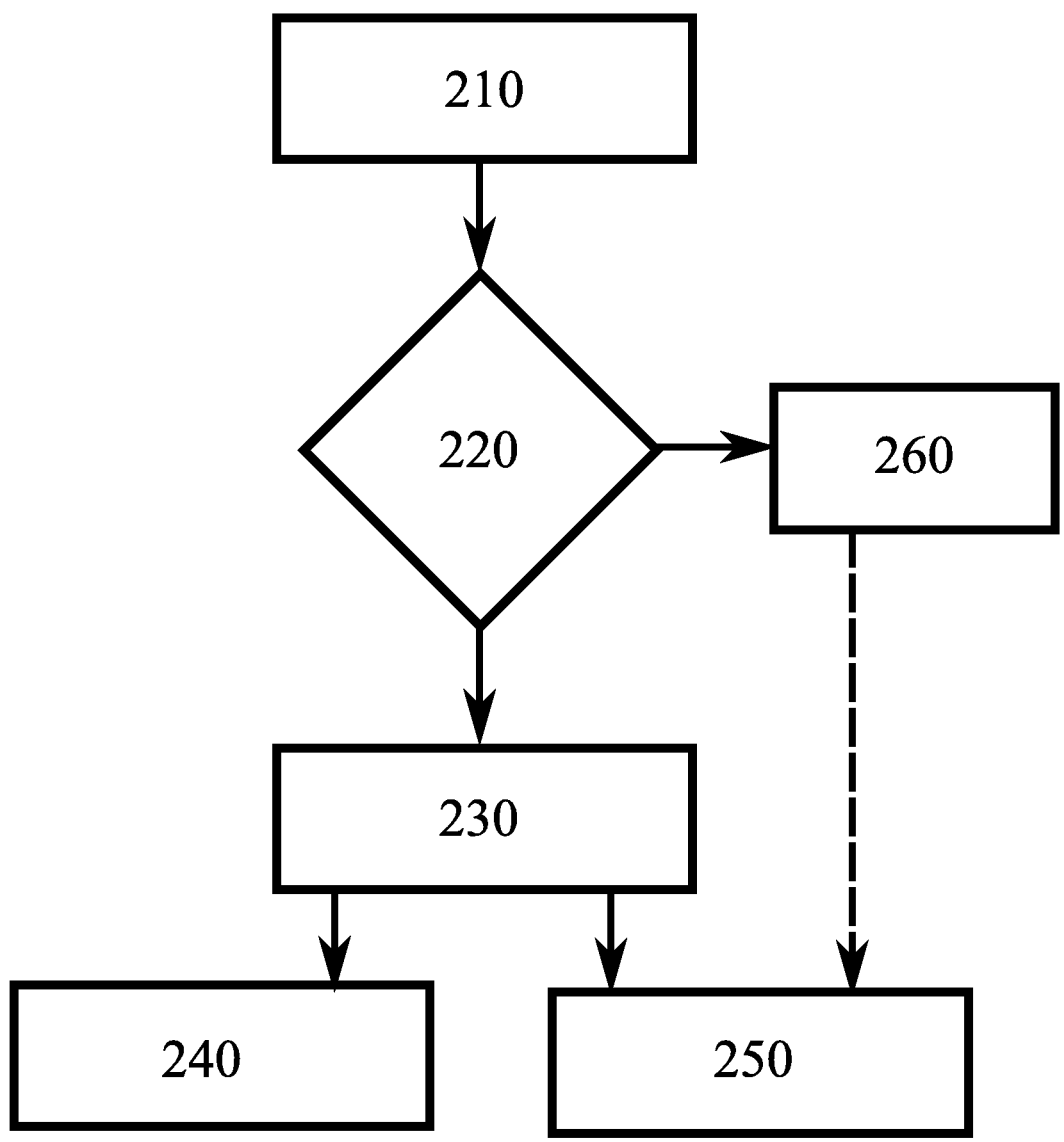
FIG. 2 illustrates an example process in accordance with at least some embodiments of the present invention.

FIG. 2 illustrates an example process in accordance with at least some embodiments of the present invention. The process may take place in a verification node, for example. In phase 210, the verification node, being in receipt of a verification request, may check whether the transaction the verification request concerns is valid according to a system consensus. This may comprise checking the cryptographic signature is correct, for example, and/or checking the transaction does not seek to transfer resources of a verification node.

In phase 220, the verification node may check the sender is in possession of the resources the transaction seeks to transfer to a new owner, or recipient. In case this is not the case, that is, if the transaction lacks resources, processing may proceed to phase 260, where a decision is taken to not verify the transaction. Where the verification is declined, a message to that effect may be transmitted to the merchant, however this is not a mandatory step and is absent in some embodiments.

Where phase 230 indicates the sender is indeed in possession of the resources the transaction involves, the verification node may send a verification acceptance message to other verification nodes, phase 240, and to the merchant, phase 250.

In general, when a transaction that is verified is broadcast to the system, the broadcasting may comprise verification information, which may identify the verification node that verified the transaction. Therefore, when the next block will be established, the nodes establishing the next block may easily determine that the transaction is of the verified type, and which verification node verified it. This broadcasting may be initiated by verification node 110 or merchant 120, for example.

Figure 3:
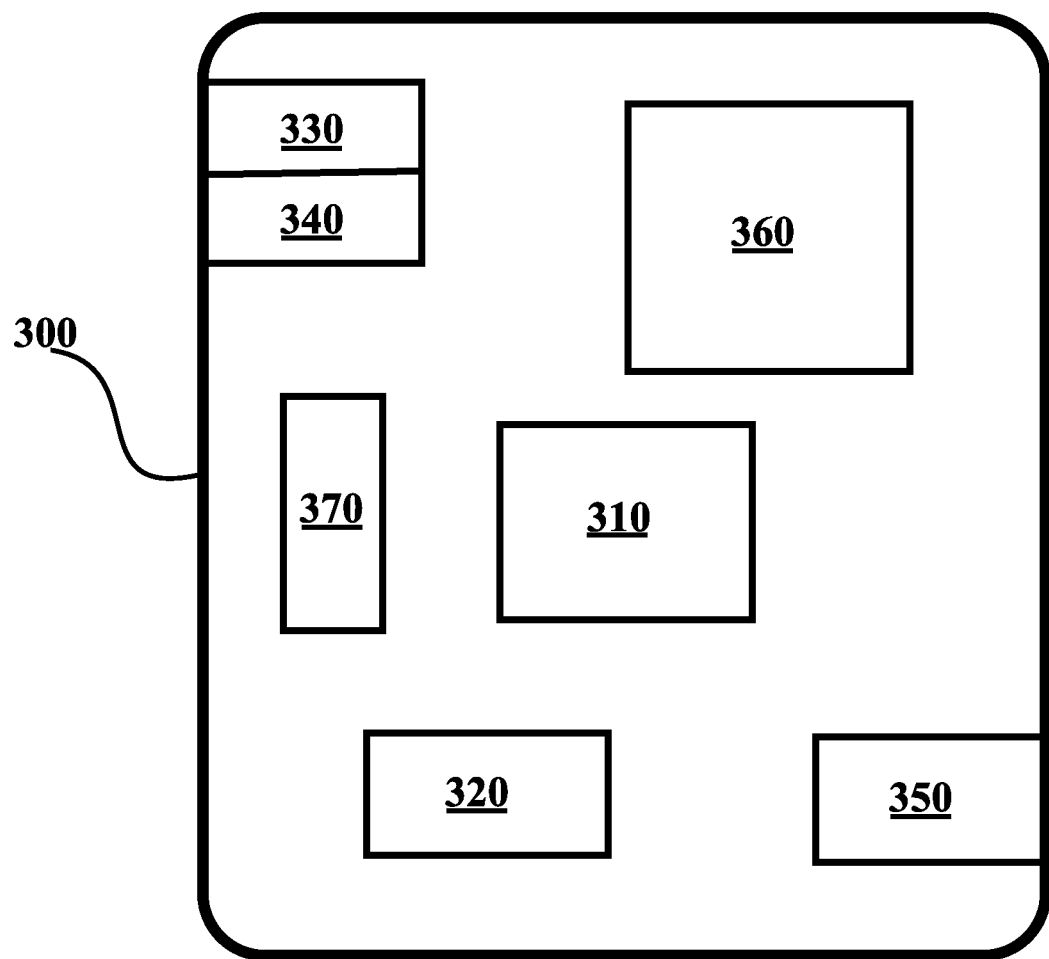
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, merchant 120, verification node 110, client device 130, or a system node such as node 101, 102, 103, 104 and/or 105, in applicable parts, of FIG. 1. Comprised in device 300 is processor 310, which may comprise, for example, a single- or multi-core processor wherein a single-core processor comprises one processing core and a multi-core processor comprises more than one processing core. Processor 310 may comprise more than one processor. A processing core may comprise, for example, a Cortex-A8 processing core manufactured by ARM Holdings or a Steamroller processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to initiate transactions.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera.

Some devices 300 may comprise a back-facing camera and a front-facing camera, wherein the back-facing camera may be intended for digital photography and the front-facing camera for video telephony. Device 300 may comprise a fingerprint sensor, or other biometric sensor, arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
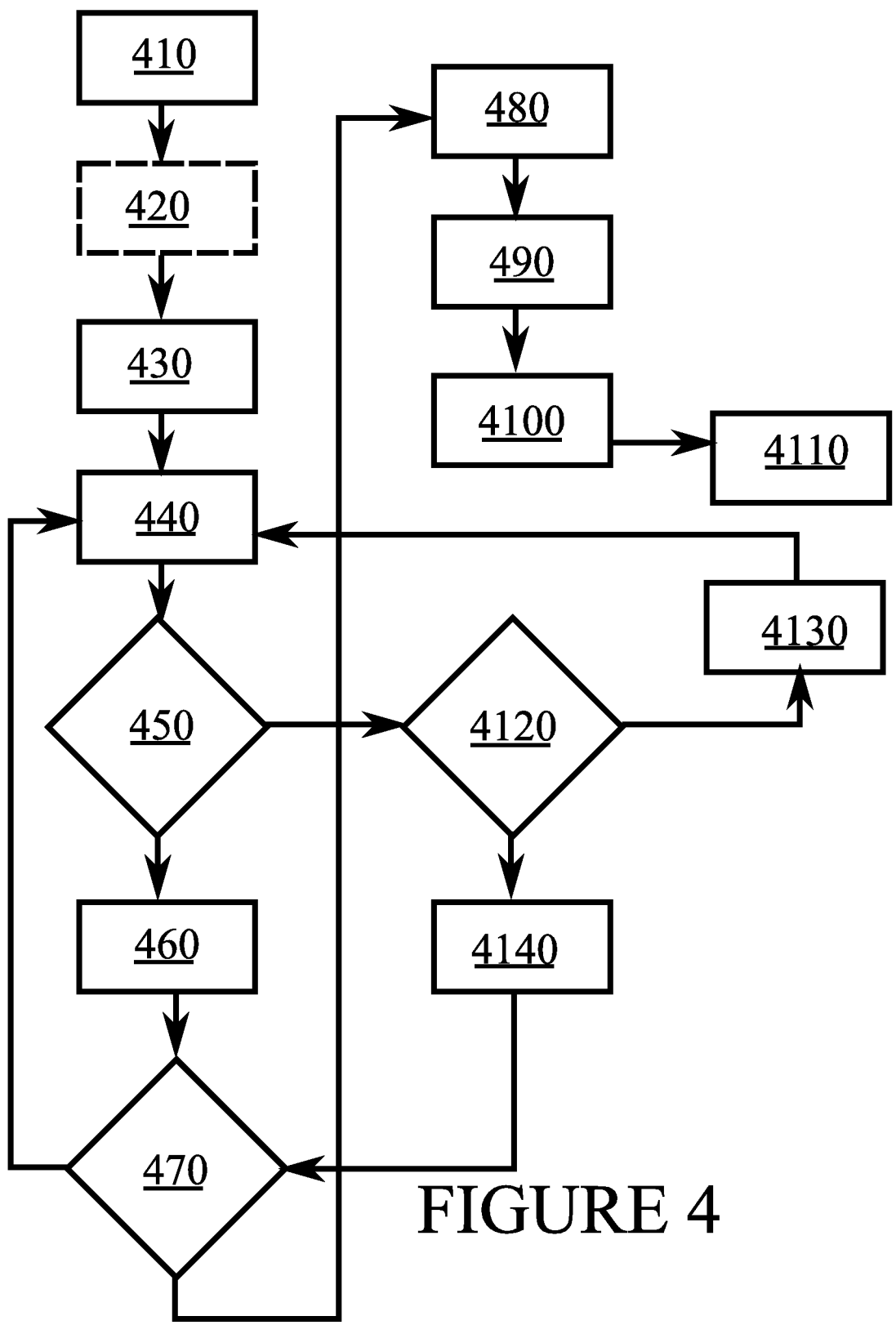
FIG. 4 illustrates an example process in accordance with at least some embodiments of the present invention.

FIG. 4 illustrates an example process in accordance with at least some embodiments of the present invention. The process of FIG. 4 relates to establishing a next block in the block chain.

Initially, in phase 410, a node compiles an initial set of transactions that have occurred since establishment of the most recent established block. In optional phase 420, transactions that seek to transfer resources of verification nodes are discarded. In phase 430, transactions in the set of transactions are ordered according to times, when they appeared in the system. For example, older transactions are arranged before newer ones.

Phase 440 proceeds, for each transaction not seeking to transfer resources of a verification node, to phase 450. In phase 450, it is checked, whether the sender of the transaction controls the resource the transaction seeks to transfer. In case this is the case, the transaction is left in the set and processing advances to phase 460, and if not, processing advances to phase 4120.

In phase 460, the transaction is applied to the new block, and processing proceeds to phase 470, where it is checked, whether there are further transactions. If there are further transactions, processing advances back to phase 440, and if not, processing advances to phase 480. In phase 480, transactions that do transfer resources to, or from, verification nodes are processed, such that in phase 490 these transactions are applied to the new block. Once also these transactions are applied, the block is ready for establishment. The proof-of-work is calculated in phase 4100, and once it is found, the new block is published in phase 4110. Phases 4110 and 4110 make the establishment of the new block effective in the system.

Returning then to the case where it is, in phase 450, determined the sender does not control the resource the transaction seeks to transfer. In this case, processing advances, as described above, to phase 4120. In phase 4120, it is in turn checked, whether the transaction was verified, that is, whether a verification node transmitted a verification acceptance message concerning the transaction. If this was not done, that is, if the transaction was not verified, processing advances to phase 4130, where the transaction is discarded, and therefrom again to phase 440. Discarding the transaction in this context means the transaction is not included in the new block.

If, on the other hand, it is in phase 4120 determined the transaction was in fact verified, processing advances to phase 4140, where resources corresponding to those lacking are caused to be transferred from a verification node that verified the transaction, to the recipient of the verified transaction that lacks resources. For example a new transaction may be entered into the new block, which transfers the lacking resources from the verification node to the recipient of the transaction. From phase 4140, processing advances back to phase 470. In this exceptional case, the new transaction may lack a cryptographic signature of the verification node for this specific new transaction, but a cryptographic signature of the verification node may be present in the verification accept message and/or the verification information broadcast with the transaction. The system may be configured to accept such a cryptographic signature as an acceptance of the verification node to transfer its resources in a situation where the verified transaction is found to lack resources.

In general, that is, not only relating to FIG. 4, where a group of verification nodes together verified the transaction lacking resources, the group may share the burden of making up for the lacking resources.

Figure 5:
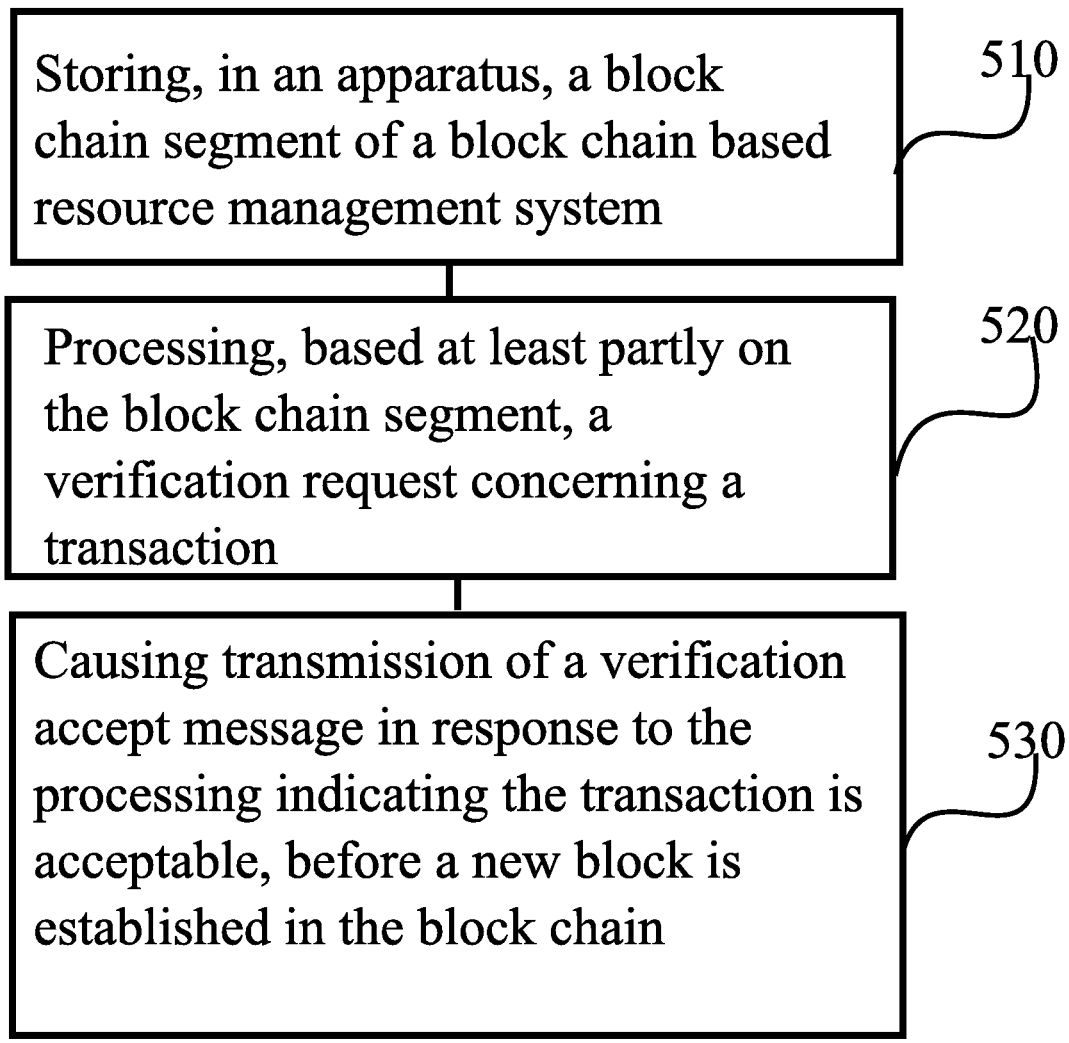
FIG. 5 is a first flow graph of a method in accordance with at least some embodiments of the present invention.

FIG. 5 is a first flow graph of a method in accordance with at least some embodiments of the present invention. The phases of the illustrated method may be performed in verification node 110, or in a control device configured to control the functioning thereof, when implanted therein.

Phase 510 comprises storing, in an apparatus, a block chain segment of a block chain based resource management system. Phase 520 comprises processing, based at least partly on the block chain segment, a verification request concerning a transaction.

Phase 530 comprises causing transmission of a verification accept message in response to the processing indicating the transaction is acceptable, before a new block is established in the block chain.

Figure 6:
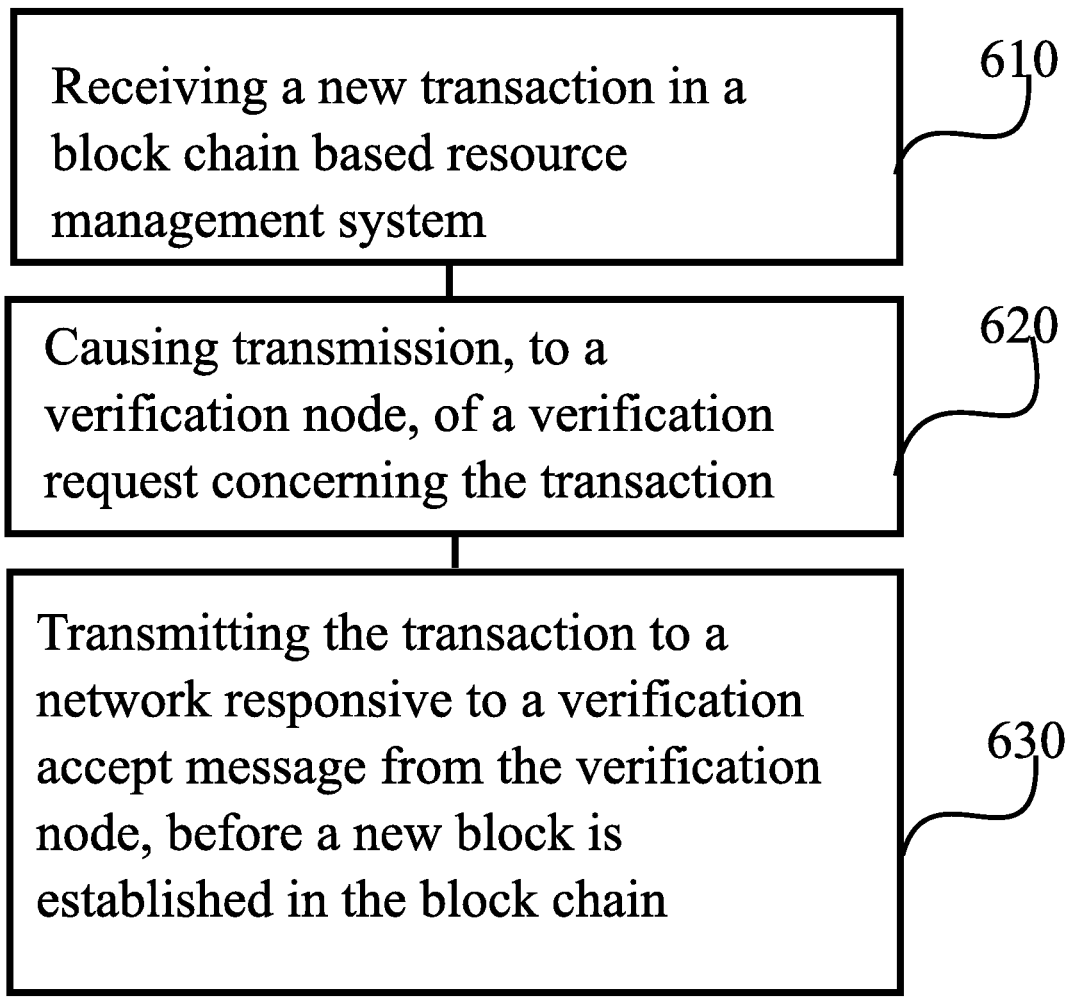
FIG. 6 is a second flow graph of a method in accordance with at least some embodiments of the present invention.

FIG. 6 is a second flow graph of a method in accordance with at least some embodiments of the present invention. The phases of the illustrated method may be performed in merchant 120, or in a control device configured to control the functioning thereof, when implanted therein.

Phase 610 comprises receiving a new transaction in a block chain based resource management system. Phase 620 comprises causing transmission, to a verification node, of a verification request concerning the transaction. Phase 630 comprises transmitting the transaction to a network responsive to a verification accept message from the verification node, before a new block is established in the block chain.

Figure 7:
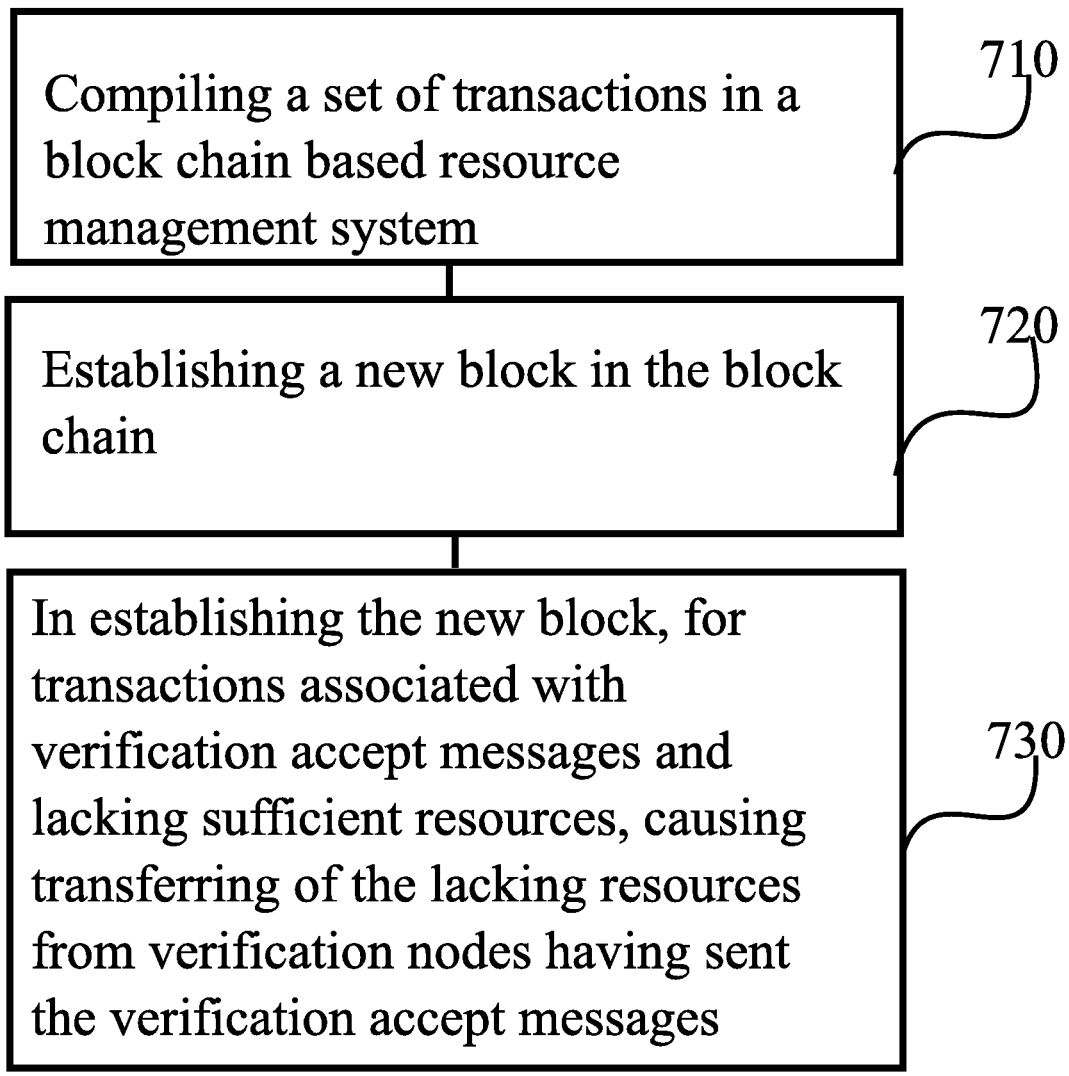
FIG. 7 is a third flow graph of a method in accordance with at least some embodiments of the present invention.

FIG. 7 is a third flow graph of a method in accordance with at least some embodiments of the present invention. The phases of the illustrated method may be performed in a miner node, or in a control device configured to control the functioning thereof, when implanted therein.

Phase 710 comprises compiling a set of transactions in a block chain based resource management system that have taken place after the most recent block was established. Phase 720 comprises establishing a new block in the block chain. Phase 730 comprises, in establishing the new block, for transactions associated with verification accept messages and lacking sufficient resources, causing transferring of the lacking resources from verification nodes having sent the verification accept messages. The new block is the next block in the block chain.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in verifying cryptographic transactions.

ACRONYMS LIST

IP internet protocol

REFERENCE SIGNS LIST

| | |
|---|---|
| 110 | Verification node |
| 120 | Merchant |
| 130 | Customer |
| 101, 102, 103, 104, 105 | System nodes, at least some of which may also be miner nodes |
| 210-250 | Phases of the method of FIG. 2 |
| 300-370 | Structure of the apparatus of FIG. 3 |
| 410-4140 | Phases of the method of FIG. 4 |
| 510-530 | Phases of the method of FIG. 5 |
| 610-630 | Phases of the method of FIG. 6 |
| 710-730 | Phases of the method of FIG. 7 |

The invention claimed is:

1. An apparatus comprising at least one processor; and at least one memory including computer program code for one or more programs, the at least one memory and the computer program code configured to, with the at least one processor, cause the apparatus to perform at least the following:
store a block chain segment of a block chain based resource management system wherein the managed resource is file storage capacity;
process, based at least partly on the block chain segment, a verification request concerning a file storage capacity transaction transferring file storage capacity from one or more verifying nodes to a recipient lacking resources, and
cause transmission of a verification accept message, to the resource management system, in response to the processing indicating the transaction is acceptable, before a new block comprising the transaction is established in the block chain; wherein the transferring file storage capacity includes, for each transaction associated with a verification accept message and lacking sufficient resources, in the new block, a transaction that transfers file storage capacity from the one or more verifying nodes that sent the associated verification message, to a recipient of the transaction lacking sufficient resources.

2. The apparatus according to claim 1, wherein the at least one processor is configured to process the verification request at least partly by determination, whether a cryptographic signature comprised in the verification request is associated with sufficient resources to perform the transaction.

3. The apparatus according to claim 1, wherein the apparatus further comprises a verification node, and the at least one processor is configured to process the verification request at least partly in collaboration with other verification nodes.

4. The apparatus according to claim 3, wherein the collaboration comprises transmitting the verification request to the other verification nodes.

5. The apparatus according to claim 3, wherein the collaboration comprises requesting further block chain segments from the other verification nodes.

6. The apparatus according to claim 3, wherein the apparatus is further configured to transmit the verification accept message to at least one further verification node.

7. The apparatus according to claim 1, wherein the verification accept message comprises a cryptographic signature of the apparatus.

8. The apparatus according to claim 1, wherein the apparatus is further configured to transmit the verification accept message to a node that sent the verification request to the apparatus.

9. A method comprising:
   storing, in an apparatus, a block chain segment of a block chain based resource management system wherein the managed resource is file storage capacity;
   processing, based at least partly on the block chain segment, a verification request concerning a file storage capacity transaction transferring file storage capacity from one or more verifying nodes to a recipient lacking resources, and
   causing transmission of a verification accept message, to the resource management system, in response to the processing indicating the file storage capacity transaction is acceptable, before a new block comprising the transaction is established in the block chain; wherein the transferring file storage capacity includes, for each transaction associated with a verification accept message and lacking sufficient resources, in the new block, a transaction that transfers file storage capacity from the one or more verifying nodes that sent the associated verification message, to a recipient of the transaction lacking sufficient resources.

10. The method according to claim 9, wherein the processing of the verification request comprises determining, whether a cryptographic signature comprised in the verification request is associated with sufficient resources to perform the transaction.

11. The method according to claim 9, wherein the apparatus comprises a verification node, and the processing of the verification request comprises collaborating with other verification nodes.

12. The method according to claim 11, wherein the collaborating comprises transmitting the verification request to the other verification nodes.

13. The method according to claim 11, wherein the collaborating comprises requesting further block chain segments from the other verification nodes.

14. The method according to claim 11, further comprising transmitting the verification accept message to at least one further verification node.

15. The method according to claim 9, wherein the verification accept message comprises a cryptographic signature of the apparatus.

16. The method according to claim 9, wherein the verification accept message is transmitted to a node that sent the verification request to the apparatus.

17. A non-transitory computer readable medium having stored thereon a set of computer readable instructions that, when executed by at least one processor, cause an apparatus to at least:
   store a block chain segment of a block chain based resource management system wherein the managed resource is file storage capacity;
   process, based at least partly on the block chain segment, a verification request concerning a file storage capacity transaction transferring file storage capacity from one or more verifying nodes to a recipient lacking resources, and
   cause transmission of a verification accept message, to the resource management system, in response to the processing indicating the file storage capacity transaction is acceptable, before a new block comprising the transaction is established in the block chain;
   wherein the transferring file storage capacity includes, for each transaction associated with a verification accept message and lacking sufficient resources, in the new block, a transaction that transfers file storage capacity from the one or more verifying nodes that sent the associated verification message, to a recipient of the transaction lacking sufficient resources.

\* \* \* \* \*